(12) United States Patent
Ramachandran et al.

(10) Patent No.: US 7,779,282 B2
(45) Date of Patent: Aug. 17, 2010

(54) MAINTAINING NETWORK CONNECTIVITY WHILE OPERATING IN LOW POWER MODE

(75) Inventors: Lakshmi Ramachandran, Bengalooru (IN); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 11/648,522

(22) Filed: Dec. 29, 2006

(65) Prior Publication Data

US 2008/0162682 A1 Jul. 3, 2008

(51) Int. Cl.
*G06F 1/26* (2006.01)
(52) U.S. Cl. .................. 713/323; 713/310; 370/310
(58) Field of Classification Search .......... 713/323, 713/310; 370/310
See application file for complete search history.

(56) References Cited

U.S. PATENT DOCUMENTS 5,220,671 A * 6/1993 Yamagishi ............ 713/324
5,938,771 A * 8/1999 Williams et al. ............ 713/310
6,556,580 B1 * 4/2003 Wang et al. ................. 370/412
7,424,632 B2 * 9/2008 Powers et al. ............... 713/323
7,577,857 B1 * 8/2009 Henderson et al. .......... 713/320

* cited by examiner

*Primary Examiner*—Thuan N Du
(74) *Attorney, Agent, or Firm*—Blakely, Sokoloff, Taylor & Zafman LLP

(57) ABSTRACT

A sub-system may maintain the network connectivity of the device, while the device is operating in low power. The sub-system may determine whether a pre-specified pattern is present in the incoming packet. The sub-system may send network messages such as keep-alive or time-out messages on behalf of the device if a first pattern is detected in the incoming packet. A first action associated with the first pattern may indicate that a network message is to be sent to another device. The sub-system may send a wake-up signal to the device if a second pattern is detected in the incoming packet. A second action associated with the second pattern may indicate that a wake-up signal is to be sent to the device.

17 Claims, 4 Drawing Sheets

MAINTAINING NETWORK CONNECTIVITY WHILE OPERATING IN LOW POWER MODE

BACKGROUND

One of the key usage models for systems or devices comprising platforms, such as Intel® Centrino® mobile platforms may be collaboration applications. The collaboration applications may comprise, for example, voice over IP (VoIP), audio, video, data, and other similar applications. A system such as a client device may maintain network connectivity to receive a VoIP call or management functions, such as a security patch or a software upgrade. It may be a desirable feature for a client device to maintain network connectivity. However, the client device may need to operate in active state to maintain the network connectivity, while operating in the active state, may approximately consume 10 watts of power.

To save power, the device may enter low-power mode such as a stand-by or a hibernation mode if pre-defined conditions, such as detecting in-activity for a pre-specified time period, occur. However, the device may lose network connectivity and as a result, may not be available on the network to respond to network events, such as sending keep-alive messages, while operating in the low power mode. Also, the collaboration applications supported on the client device may be unable to receive an incoming VoIP call or management functions. After waking-up from the low-power mode, the device may need to exchange a number of messages before being coupled to the network and receive data units of the collaboration applications. Such a delay in establishing the network connectivity may cause disconnection.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale.

For example, the dimensions of some elements may be exaggerated relative to other elements for clarity. Further, where considered appropriate, reference labels have been repeated among the figures to indicate corresponding or analogous elements.

DETAILED DESCRIPTION

The following description describes maintaining network connectivity while operating in a low power mode. In the following description, numerous specific details such as logic implementations, resource partitioning, or sharing, or duplication implementations, types and interrelationships of system components, and logic partitioning, or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices electrical, optical, and acoustical signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
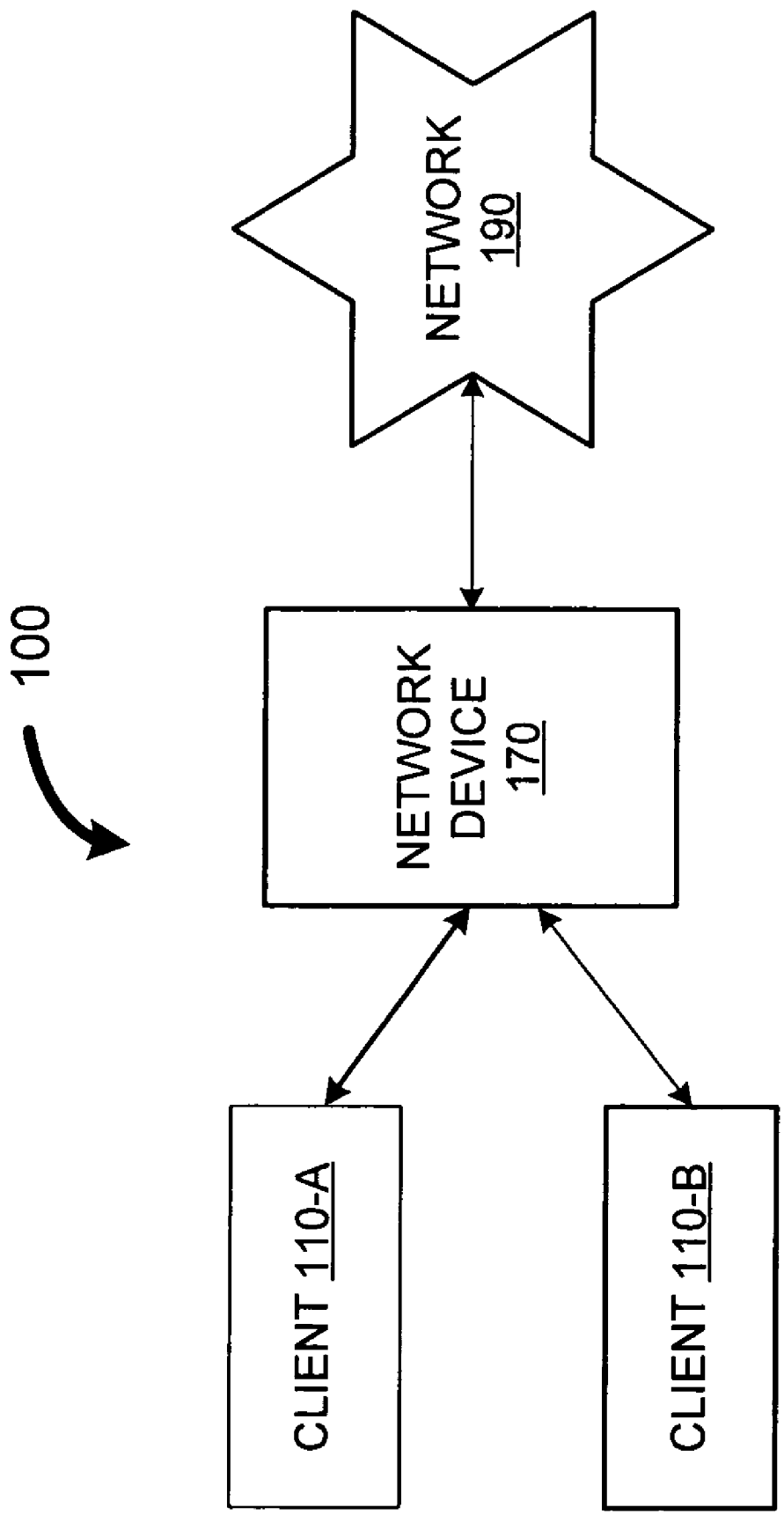
FIG. 1 illustrates an embodiment of a network environment.

An embodiment of a network environment 100 is illustrated in FIG. 1. The network environment 100 may comprise a system such as a client 110-A, a client 110-B, a network device 170, and a network 190.

In one embodiment, the client 110 may comprise subsystems, which may maintain network connectivity while the client 110 operates in low-power mode.

For example, while operating in the low-power mode, the client 110-A may send keep-alive messages, refresh session keys, or send similar other messages to the network device 170. In one embodiment, the client 110-A may periodically send keep-alive messages to the other devices in the network to indicate its presence. Also, the client 110-A may wake-up from the low-power mode on occurrence of events such as receiving a VoIP call from the client 110-B or receiving a management function from a system administrator or a server.

The client 110 may represent a system such as a desktop, a laptop computer, a hand held device, or a mobile phone. In one embodiment, the client 110 may comprise wireless local area network (WLAN) components to send and receive radio signals over a wireless medium. In one embodiment, the client 110 may comprise Intel® Centrino® based platform that may support wired and wireless connectivity to enable the client 110 to communicate with network devices such as the network device 170. The client 110 may, for example, support protocol suites such as hyper text transfer protocol (HTTP), file transfer protocols (FTP), transmission control protocol/internet protocol (TCP/IP), IEEE standard 802.11™ protocol suites and such other protocols.

The network device 170 may act as a communication hub for coupling the client 110-A and 110-B to the network 150. In one embodiment, the network device 170 may, also, comprise sub-systems, which may maintain network connectivity to the client 110-A, which may be operating in low-power mode. In one embodiment, the network device 170 may represent an access point, a router, or a switch, which may comprise components that may support the client 110 to couple to the network 150. In one embodiment, the network device 170 may comprise modules such as WLAN components to receive and send radio signals to the client 110. In one embodiment, the network device 170 may send and receive packets to the client 110 over a wired link. The network device 170 may support protocol suites such as IEEE standard 802.11™ and TCP/IP.

The network 150 may comprise one or more intermediate devices such as switches and routers, which may receive, process, and send the packets to an appropriate network device. The network 150 may enable a device such as the client 110-A and 110-B to transmit and receive data. The intermediate network devices of the network 150 may be configured to support various protocols such as TCP/IP.

Figure 2:
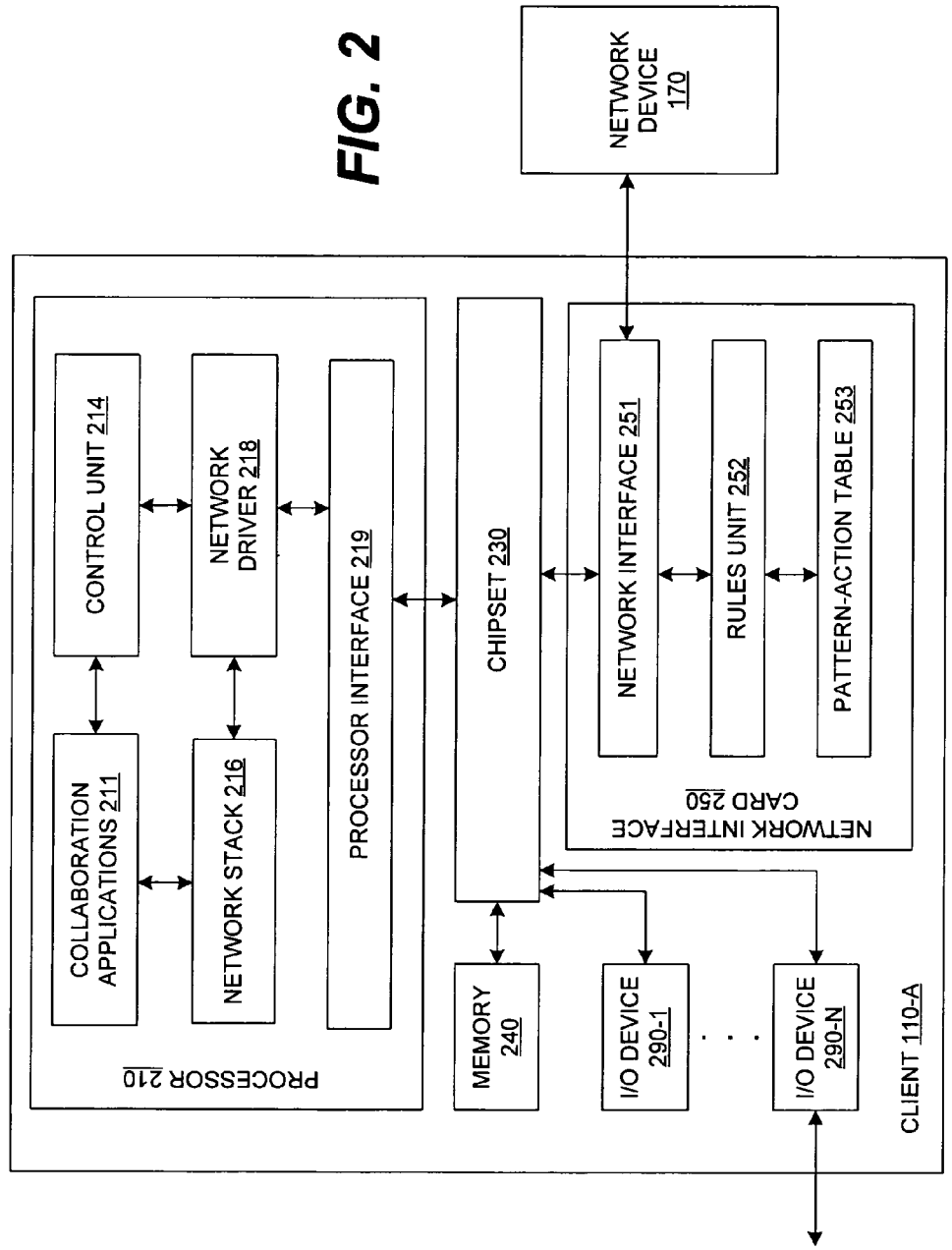
FIG. 2 illustrates an embodiment of a client device of the network environment of FIG. 1.

An embodiment of the client 110 is illustrated in FIG. 2. The client 110 may comprise sub-systems such as a processor 210, a chipset 230, a memory 240, a network interface card (NIC) 250, and I/O devices 290-A to 290-N.

The chipset 230 may comprise integrated circuits that couple the processor 210, the memory 240, the NIC 250, and the I/O devices 290. In one embodiment, the chipset 230 may transmit packets from the processor 210 to the memory 240, the NIC 250, and the I/O devices 290 on behalf of the processor 210. In one embodiment, the chipset 230 may support links such as the PCI Express links to transmit transactions to the NIC 250 and the I/O devices 290.

The memory 240 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, devices comprising NVM technology, or other volatile and/or non-volatile memory devices used in the computing devices such as the client 110.

The I/O devices 290 may comprise devices such as display unit, key-board, mouse, pen-drives, USB devices, SATA devices, and such other devices that a user may use to interface with the processor 210. In one embodiment, the I/O device 290-N may comprise a display unit such as a cathode ray tube (CRT) monitor, liquid crystal display (LCD), and such other components to display user interfaces such as a graphic user interface (GUI). In one embodiment, the display unit of I/O device 290-N may receive data units from the policy engine 214 to render the user interfaces.

Maintaining network connectivity during the low-power mode operation of the client 110-A may be described in different configurations. Some configurations based on the provision of the sub-system components may be referred to as a (1) Client-initiated approach (2) Network-assisted approach, and (3) Hybrid approach.

In a client based approach, the processor 210 may manage various resources and processes within the client 110 and may execute software instructions as well. The processor 210 may comprise, for example, microprocessors from the Pentium®, Itanium®, or Core Duo® family of Intel® microprocessors. In one embodiment, the processor 210 may comprise a collaboration application 211, a control unit 214, a network stack 216, a network driver 218, and a processor interface 219.

The processor interface 219 may pass the packets generated by the components of the processor 210 to the memory 240, the NIC 250, and I/O devices 290. The processor interface 219 may receive packets from the chipset 230 and may pass the packets to the network driver 218. In one embodiment, the processor interface 219 may receive configuration values and may pass the configuration values to the network driver 218. The processor interface 219 may support electrical, physical, and protocol interfaces between the processor 210 and the chipset 230. In one embodiment, the processor interface 219 may support front side bus.

The collaboration application 211 may generate data units, which correspond to an audio, a video, or a data application. In one embodiment, the collaboration application 211 may encode or compress the data units generated by, for example, a net meeting session, video conferencing session, audio conferencing session, and such other sessions. In one embodiment, an application interface such as sockets may establish sessions between the collaboration application 211 and the network stack 216. In one embodiment, the collaboration application 211 may operate under control of the control unit 214.

The network stack 216 may implement a protocol stack such as IPX/SPX or TCP/IP and may provide services to the NIC 250. The network stack 216 may, also, provide services to the collaboration application 211. In one embodiment, the network stack 211 may receive the data units from the collaboration application 211 and process the data units, for example, by adding a TCP/IP header. The network stack 211 may remove the TCP/IP headers of the packets received from the network driver 218 and may send the data units over a communication channel or a socket.

The network driver 218 may perform protocol translations, for example, from a local area network (LAN) protocol to asynchronous transfer mode (ATM) protocol, medium access control (MAC) address translations, and such other operations. The network driver 218 may comprise, for example, WLAN components that may use hardware, software, and middleware components. The network driver 218 may support direct spread spectrum sequence (DSSS), frequency hopping spread spectrum (FHSS), base-band signaling, broadband signaling and such other techniques. The network driver 218 may operate under control of the control unit 214.

In one embodiment, the control unit 214 may support a user interface, for example, a graphic user interface (GUI), which may be rendered on the I/O device 290-N, a display unit for example. In one embodiment, the control unit 214 may support a policy engine, which may display, on the GUI, one or more parameters and a range of values for each parameter. A user may choose values, from the range of values, for the parameters and a set of such values may be referred to as 'configuration values'. The control unit 214 may receive the configuration values, which may, for example, represent virtual private network (VPN) support, wake-on-management trigger, and such other parameters.

In one embodiment, the values for the VPN support may comprise VPN gateway IP address, timeout for keep-alive, and such other values. In one embodiment, the values for the wake-on-management trigger may comprise specific patterns to look for in a packet. For example, the user may select a value of 10.221.80.55, 30, and 0808, which may correspond to VPN gateway IP address, timeout for keep-alive, and pattern representing, for example, a port address to look for in the incoming packet. For example, a set {(10.221.80.55), (30), and (0808)} may be referred to as configuration values.

In one embodiment, the control unit 214 may generate rules based on the configuration values and may send the rules to the NIC 250 or the control unit 214 may, merely, pass the configuration values to the NIC 250. In one embodiment, a rule may comprise a pattern to be matched and an action to be performed if an incoming packet comprises the pattern. In one embodiment, the pattern may represent a pre-specified stream of bits and the occurrence of the pre-specified stream of bits in an incoming packet may trigger pre-defined actions. In one embodiment, the pattern may represent a time-out value or a packet classifier such as the protocol header. For example, the protocol header may comprise a MAC address, an IP address, a protocol type, or a port number. In one embodiment, the action may represent a pre-specified function that may be performed if the incoming message comprises the pattern or after time-out period elapses. For example, the action may include transmitting pre-specified messages or waking-up the components of the client 110-A.

In one embodiment, the control unit 214 may wake-up the components of the client 110-A in response to receiving a wake-up signal. In one embodiment, the control unit 214 may detect an ASSERT_PME signal on the bus asserted by the NIC 250 and may initiate wake-up of the components of the client 110-A.

In one embodiment, the subsystem such as the network interface card 250 may receive a message from the network device 170. In one embodiment, the sub-system may determine whether a pattern is found in the message or an incoming packet and may perform an action associated with a pattern if the pattern occurs in the incoming packet. In one embodiment, the network interface card (NIC) 250 may comprise a network interface 251, a rules unit 252, and a pattern-action table 253.

In one embodiment, the network interface 251 may receive the rules from the control unit 214 and may send the rules to the rules unit 252. The network interface 251 may receive an incoming packet from the network device 170 and may send the incoming packet to the rules unit 252. The network interface 251 may receive a network message or a wake-up signal from the rules unit 252. In one embodiment, the network interface 251 may forward the network messages such as the keep-alive messages or time-out messages to the network device 170. The network interface 251 may pass the wake-up signal to the control unit 214. The network interface 251 may support electrical, physical, and protocol interfaces between the NIC 250 and the chipset 230. In one embodiment, the network interface 251 may support PCI Express bus.

In one embodiment, the rules unit 252 may receive the configuration values, from the control unit 214, and may generate rules based on the configuration values. In other embodiment, the rules unit 252 may receive the rules from the control unit 214. The rules unit 214 may generate a pattern-action combination based on each rule. In one embodiment, the rules unit 252 may receive the configuration values or the rules, from the control unit 214, while the client 110-A is in active state. The rules unit 252 may store the pattern-action combination to the pattern-action table 253. In one embodiment, the rules unit 252 may update the pattern-action combination list, stored in the pattern-action table 253, in response to receiving an add rule signal from the control unit 214. In one embodiment, the rules may get activated after the client 110-A enters a low-power mode.

In one embodiment, the rules unit 252 may receive an incoming packet from the network interface 251 and determine if any pattern, stored in the table 253, is present in the incoming packet. In one embodiment, the rules unit 252 may perform an action associated with a pattern that is present in the incoming packet. In one embodiment, the action corresponding to a first pattern may indicate that a keep-alive message may be transmitted to the network device 170. In one embodiment, the keep-alive message transmitted to the network device 170 may be sent by the rules unit 252 on behalf of the higher level layers implemented in the processor 210.

In one embodiment, the action corresponding to a second pattern may indicate that a wake-up signal may be sent to the control unit 214. For example, the second pattern may equal a port number 0808 and the action associated with the pattern 0808 may equal 'wake-up the client 110-A'. In one embodiment, the rules unit 252 may determine the presence of 0808, for example, in a header of the incoming packet. In response to determining the presence of the second pattern 0808, the rules unit 252 may assert an event ASSERT_PME on the bus, which indicates to the control unit 214 that the client 110-A may be woken up from the low-power mode.

For example, the pattern 0808 may refer to a port on which an incoming VoIP call may be received and the control unit 214 may wake-up a corresponding application in the collaboration application 211 to receive the VoIP call. In one embodiment, the logic for maintaining the network connectivity during the low-power mode operation of the client 110-A may be stored as a microcode in the rues unit 252.

In a network-assisted approach, the network device 170 may comprise components of the sub-system such as the NIC 250. In one embodiment, the network device 170 may maintain the network connectivity for the client 110-A during low-power mode of operation of the client 110-A. In one embodiment, the network device 170 may detect the presence of patterns in the incoming packet and may perform an action associated with the patterns. In one embodiment, the network device 170 may wake-up the client 110-A, for example, to receive a VoIP call if the second pattern occurs in the incoming packet.

In one embodiment, the network device 170 may send, for example, keep-alive messages if the first pattern occurs in the incoming packet. In one embodiment, the network device 170 may send the keep-alive message on behalf of the client 110-A. Thus, the network connectivity to the client 110-A may be maintained by the network device 170 while the client 110-A is operating in a low-power mode.

In a hybrid approach, some components of the sub-system such as the NIC 250 may be provisioned in the client 110-A and some other components may be provisioned in the network device 170. For example, the sub-system of the client 110-A and the sub-system of the network device 170 may each perform a sub-set of the rules. In one embodiment, the sub-system of the network device 170 may check whether one or more patterns are present in a broadcast or multicast type of messages. In one embodiment, the sub-system of the client 110-A may check whether one or more patterns are present in the uni-cast messages. In other embodiments, the sub-system of the network device 170 may detect the presence of the pattern and send appropriate signals such as the network messages or the wake-up signals based on the action associated with the pattern.

Figure 3:
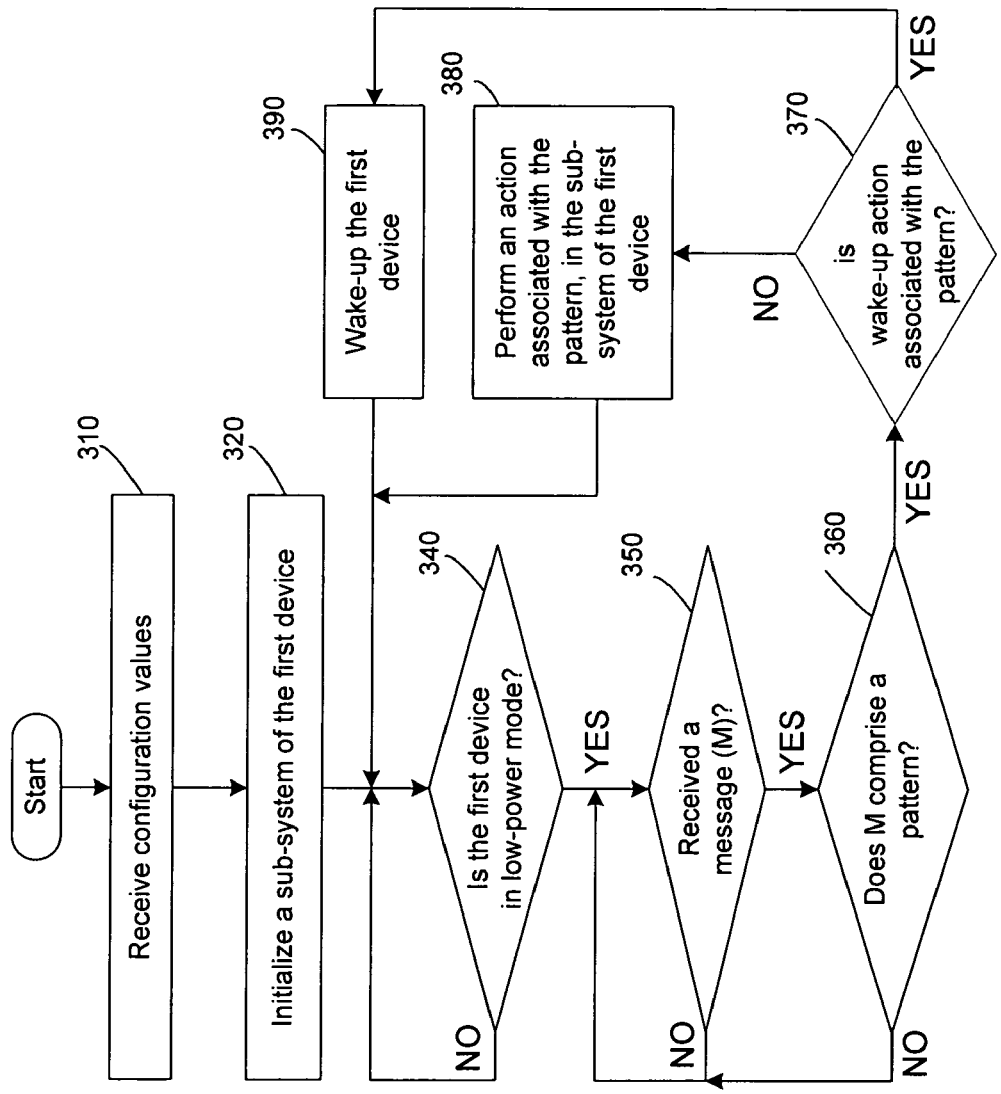
FIG. 3 illustrates an embodiment of the client device maintaining the network connectivity during the low-power mode of operation of the client device.

An embodiment of the client 110-A managing the network connectivity during a low-power mode of operation is illustrated in FIG. 3. In one embodiment, flow-chart of FIG. 3 may illustrate the client-based approach described above. In block 310, the client 110-A may receive configuration values. As described above, the control unit 214 may receive configuration values provided by a user using the GUI.

In block 320, the control unit 214 may initialize a subsystem of a first device based on the configuration values. In one embodiment, the control unit 214 may initialize the subsystem such as the NIC 250 of the first device, the client 110-A. In one embodiment, the rules unit 252 of the NIC 250 may receive the configuration values from the control unit 214 and generate a pattern-action combination for each rule framed based on the configuration values.

In block 340, the rules unit 252 of the sub-system such as the NIC 250 may determine whether the first device is in low-power mode and may cause control to pass to block 350 if the first device is in low-power mode and to block 340 if the first device is in active mode.

In block 350, the rules unit 252 of the sub-system such as the NIC 250 may check whether a message M is received. The sub-system may cause control to pass to block 360 if the message M such as an incoming packet is received and to block 350 otherwise.

In block 360, the rules unit 252 may determine whether the message M comprises a pattern of the pattern-action combinations generated in block 320. The rules unit 252 may cause control to pass to block 370 if the message M comprises a pattern and to block 350 otherwise.

In block 370, the rules unit 252 may check if a wake-up action is associated with the pattern and control passes to block 390 if the wake-up pattern is associated with the pattern and to block 380 otherwise.

In block 380, the rules unit 252 may perform an action associated with the pattern and control may pass to block 340. In one embodiment, the rules unit 252 may send a keep-alive message to the network device 170 on behalf of the higher level network layers of the client 110-A.

In block 390, the rules unit 252 may wake-up the first device. In one embodiment, the rules unit 252 may send, for example, an ASSERT_PME message on the bus such as the front side bus. The control unit 214 may detect the asserted signal and may wake-up the components of the client 110-A. In one embodiment, the control unit 214 may switch the client 110-A from low-power mode to the active mode.

In one embodiment, the power consumed in the low-power mode may, approximately, equal 300 milli-watts and the power consumed in the active mode may, approximately, equal 10 watts. As the sub-system such as the NIC 250 may maintain the network connectivity during low-power mode operation of the client 110-A, the power consumed by the client 110-A may be conserved. As a result, the battery life of the batteries supplying power to the client 110-A may be extended.

Figure 4:
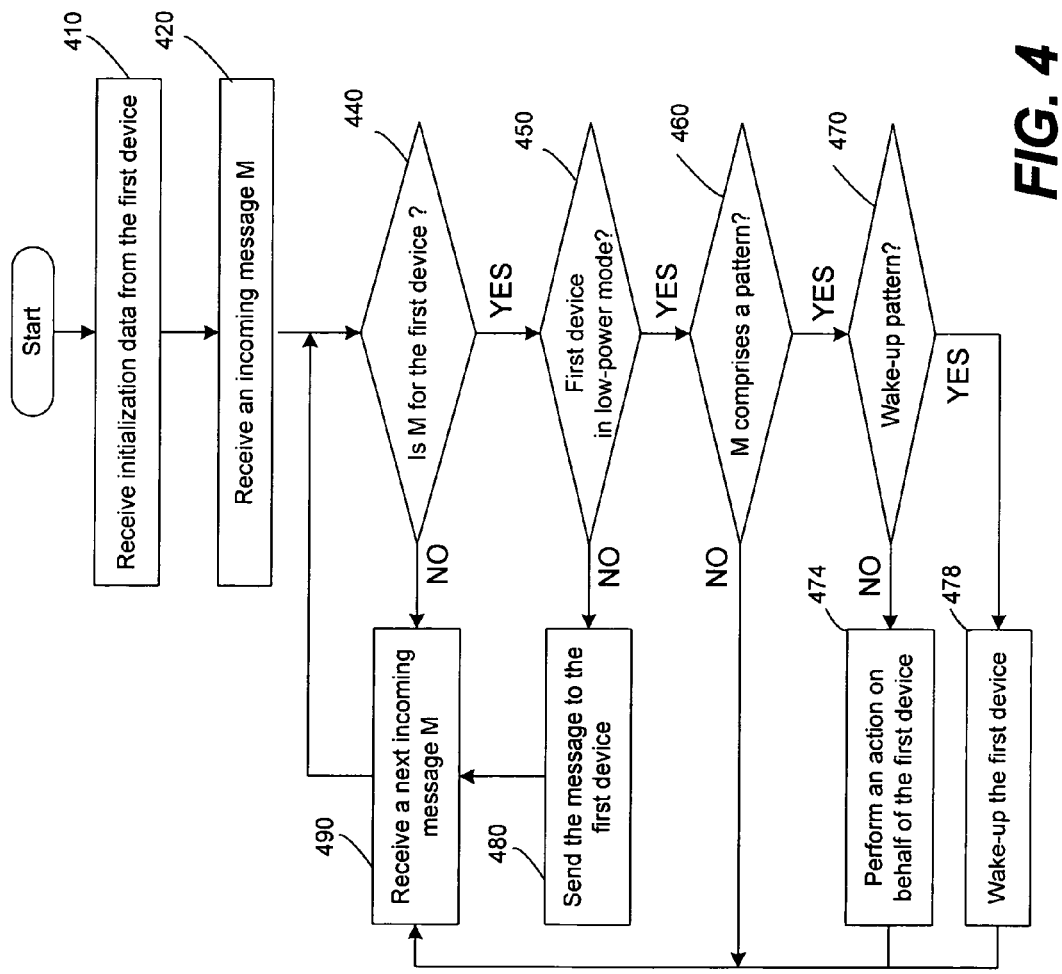
FIG. 4 illustrates an embodiment of the network device maintaining the network connectivity to the client device during the low-power mode of operation of the client device.

An embodiment of the network device 170 managing the network connectivity of the client 110-A during a low-power mode of operation is illustrated in FIG. 4. In one embodiment, flow-chart of FIG. 4 may illustrate the network-based approach described above.

In block 410, a second device may receive an initialization data from the first device. In one embodiment, the network device 170, which may be referred to as the second device, may receive a list of pattern-action values or may receive the configuration values and generate a list of pattern-action values.

In block 420, the second device may receive a message M, for example, from the network 150. In block 440, the second device may check whether the message M is for the first device, the client 110-A and control passes to block 490 if the message M is not for the first device and to block 450 if the message M is for the first device.

In block 450, the second device may check whether the first device is in low-power mode and may cause control to pass to block 460 if the first device is in low-power mode and to block 480 otherwise.

In block 460, the second device may check whether the message M comprises a pattern of the pattern-action combinations received or generated in block 410. The second device may cause control to pass to block 470 if the message M comprises a pattern and to block 490 otherwise.

In block 470, the second device may check if a wake-up action is associated with the pattern and control passes to block 478 if the wake-up action is associated with the pattern and to block 474 otherwise.

In block 474, the second device may perform an action associated with the pattern and control may pass to block 490. In one embodiment, the second device may send a keep-alive message to a device such as a gateway coupled to the network 150 on behalf of the higher level network layers of the client 110-A.

In block 478, the second device may wake-up the first device. In one embodiment, the second device may send, for example, an ASSERT_PME message on the bus such as the front side bus and the control unit 214 may detect the asserted signal and may wake-up the components of the client 110-A. In one embodiment, the control unit 214 may switch the client 110-A from low-power mode to active mode. As the sub-system of the second device may maintain the network connectivity during low-power mode operation of the client 110-A, the power consumed by the client 110-A may be conserved. As a result, the battery life of the batteries supplying power to the client 110-A may be extended.

In block 480, the second device may send the message M to the client 110-A as the client 110-A is operating in active mode. In block 490, the second device may receive a next message and control passes to block 440.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a computer system, comprising:
generating a plurality of patterns and a plurality of actions based on configuration values, while a first device is operating in active mode, wherein the power consumed by the first device is higher in the active mode as compared that in a low-power mode,
receiving the plurality of patterns and the plurality of actions in a network device from the first device before the first device enters the low-power mode,
generating a plurality of rules based on the plurality of patterns and the plurality of actions,
generating a first action of the plurality of actions if an incoming packet comprises a first pattern of the plurality of patterns; and
generating a second action of the plurality of actions if the incoming packet comprises a second pattern of the plurality of patterns,
wherein the first and the second action are generated while the first device is operating in low-power mode.

2. The method of claim 1 comprises sending a network message to a second device to maintain the network connectivity between the first device and the second device based on the first action.

3. The method of claim 2, wherein the first pattern represents a first port number and the network message comprises a keep-alive message, wherein the keep-alive message is sent to the second device to maintain the network connectivity to the first device.

4. The method of claim 1 comprises waking-up the first device from the low-power mode to an active mode based on the second action.

5. The method of claim 1 comprises storing the plurality of patterns and the plurality of actions in a memory before the first device enters the low-power mode.

6. A machine readable storage medium comprising a plurality of instructions that in response to being executed result in a computing device causes,
generating a plurality of patterns and a plurality of actions based on configuration values, while a first device is operating in active mode, wherein the power consumed by the first device is higher in the active mode as compared that in a low-power mode,
receiving the plurality of patterns and the plurality of actions in a network device from the first device before the first device enters the low-power mode,
generating a plurality of rules based on the plurality of patterns and the plurality of actions,
generating a first action of the plurality of actions if an incoming packet comprises a first pattern of the plurality of patterns; and
generating a second action of the plurality of actions if the incoming packet comprises a second pattern of the plurality of patterns,
wherein the first and the second action are generated while the first device is operating in low-power mode.

7. The machine readable storage medium of claim 6, wherein the first action is to send a network message to a second device to maintain the network connectivity between the first device and the second device.

8. The machine readable storage medium of claim 7, wherein the first pattern represents a first port number and the network message comprises a keep-alive message, wherein the keep-alive message is sent to the second device to maintain the network connectivity to the first device.

9. The machine readable storage medium of claim 6, wherein the second action is to wake-up the first device from the low-power mode to the active mode.

10. The machine readable storage medium of claim 6, further comprises storing the plurality of patterns and the plurality of actions in a memory before the first device enters the low-power mode.

11. A computer system comprising:
a first device to generate a plurality of patterns and a plurality of actions based on configuration values, while the first device is operating in an active mode, wherein the power consumed by the first device in active mode is higher compared to that in a low-power mode; and
a network device coupled to the first device, the network device further comprises,
an interface to receive the plurality of patterns and the plurality of actions from the first device before the first device enters the low-power mode,
a rules unit coupled to the interface, wherein the rules unit is to generate a plurality of rules based on the plurality of patterns and the plurality of actions, and
a pattern-action table coupled to the rules unit, wherein the pattern-action table is to store the plurality of rules,
wherein the network device is to generate a first action of a plurality of actions if an incoming packet comprises a first pattern of the plurality of patterns and a second action of the plurality of actions if the incoming packet comprises a second pattern of the plurality of patterns,
wherein the first and the second action are generated while the first device is operating in low-power mode.

12. The computer system of claim 11, wherein the first action is to send a network message to a second device to maintain the network connectivity between the first device and the second device.

13. The computer system of claim 11, wherein the second action is to wake-up the first device from the low-power mode to the active mode.

14. The computer system of claim 11, wherein the rules unit to generate the network message based on the first action of the plurality of actions if the incoming packet comprises the first pattern.

15. The computer system of claim 14, wherein the first pattern represents a first port number and the first action represents generating keep-alive network messages.

16. The computer system of claim 11, wherein the rules unit to generate the wake-up signal based on the second action of the plurality of actions if the incoming packet comprises the second pattern.

17. The computer system of claim 16, wherein the second pattern represents a voice over internet protocol call and the second action represents sending a wake-up signal to the first device.

* * * * *